US012798463B2

(12) United States Patent
Won et al.

(10) Patent No.: US 12,798,463 B2
(45) Date of Patent: Nov. 17, 2026

(54) HEADREST FOR VEHICLE SEAT WITH AIR CELL

(71) Applicants: Hyundai Motor Company, Seoul (KR); Kia Corporation, Seoul (KR); Hyundai Transys Inc., Seosan (KR); Woobo Tech Co., Ltd., Pyeongtaek (KR)

(72) Inventors: Tae Hee Won, Uiwang (KR); Yun Ho Kim, Osan (KR); Jun Ho Lee, Yongin (KR); Da Hye Moon, Anyang (KR); Hae Il Jeong, Incheon (KR); Hyun Kim, Hwaseong (KR)

(73) Assignees: Hyundai Motor Company, Seoul (KR); Kia Corporation, Seoul (KR); Hyundai Transys Inc., Seosan (KR); Woobo Tech Co., Ltd., Pyeongtaek (KR)

( * ) Notice: Subject to any disclaimer, the term of this patent is extended or adjusted under 35 U.S.C. 154(b) by 127 days.

(21) Appl. No.: 18/752,323

(22) Filed: Jun. 24, 2024

(65) Prior Publication Data

US 2025/0249811 A1 Aug. 7, 2025

(30) Foreign Application Priority Data

Feb. 1, 2024 (KR) ........................ 10-2024-0016092

(51) Int. Cl.
*B60N 2/829* (2018.01)
*B60N 2/90* (2018.01)

(52) U.S. Cl.
CPC ............. *B60N 2/976* (2018.02); *B60N 2/829* (2018.02)

(58) Field of Classification Search
CPC ........ B60N 2/885; B60N 2/868; B60N 2/829; B60N 2/809
USPC ................ 297/391, 407, 408, 410, 403, 396
See application file for complete search history.

(56) References Cited

U.S. PATENT DOCUMENTS

| | | | | |
|---|---|---|---|---|
| 6,203,105 | B1 * | 3/2001 | Rhodes, Jr. ............ | B60N 2/806 297/284.6 |
| 10,414,312 | B2 * | 9/2019 | Fredriksson ........... | B60N 2/829 |
| 2016/0046219 | A1 * | 2/2016 | Schauf ................... | B60N 2/885 297/391 |
| 2017/0253153 | A1 * | 9/2017 | Kapusky ................ | B60N 2/885 |
| 2020/0369188 | A1 * | 11/2020 | Samain .................. | B60N 2/806 |
| 2023/0202369 | A1 * | 6/2023 | Kim ....................... | B60N 2/885 297/391 |
| 2024/0140289 | A1 * | 5/2024 | Yu .......................... | B60N 2/809 |
| 2024/0217416 | A1 * | 7/2024 | Cho ....................... | B60N 2/865 |

* cited by examiner

*Primary Examiner* — Alfred J Wujciak
(74) *Attorney, Agent, or Firm* — Fox Rothschild LLP

(57) ABSTRACT

A headrest for a seat of a vehicle includes a body portion disposed above a backrest portion; a support portion disposed in front of the body portion; and an air cell disposed on the support portion, where a volume of the air cell expands toward a front of the headrest, and the support portion is configured to be slidably movable along the body portion.

17 Claims, 9 Drawing Sheets

1

HEADREST FOR VEHICLE SEAT WITH AIR CELL

CROSS-REFERENCE TO RELATED APPLICATION

This application claims under 35 U.S.C. § 119(a) the benefit of Korean Patent Application No. 10-2024-0016092, filed on Feb. 1, 2024 with the Korean Intellectual Property Office, the entire contents of which are incorporated herein by reference.

BACKGROUND

(a) Technical Field

The present disclosure relates to a headrest for a vehicle seat, more particularly, to the headrest having an air cell.

(b) Description of the Related Art

A seat for occupants, such as drivers or passengers, is disposed in a vehicle. The seat generally includes a seating portion on which the occupants sit, a backrest portion supporting an occupant's back, and a headrest supporting an occupant's head.

The seat is in close contact with the occupants of the vehicle, and thus must be manufactured so that the seated occupant can feel comfortable.

Recently, a massage device has been applied to the seat to reduce occupant fatigue.

In order to reduce occupant fatigue, it is effective to relax occupant's neck muscles. Typically, since the headrest is designed to be in contact with the occupant's head, even if a massage device is disposed on the headrest, there is a problem in that it may be difficult to effectively massage the occupant's occupant neck muscles.

SUMMARY

The present disclosure provides a headrest having a device for massage, wherein a position of the headrest may be varied so that the massage device can effectively massage occupant's occupant neck muscles.

According to an aspect of the present disclosure, a headrest includes a body portion; a support portion operably connected to (e.g., disposed in front of) the body portion; and an air cell disposed on the support portion, where a volume of the air cell expands toward a front of the headrest, and the support portion is configured to be slidably movable along the body portion.

The headrest includes a driving unit coupled to the body portion and slidably moving the support portion with respect to the body portion.

The body portion is disposed above a backrest portion of the seat and is raised and lowered, relative to the backrest portion.

The headrest includes a driving unit disposed within the body portion and raising and lowering the body portion, relative to the backrest portion.

The seat includes a stay disposed above the backrest portion, wherein the stay guides the raising and lowering of the driving unit.

The support portion includes a center portion, and a first wing out and a second wing out respectively disposed on one side and the other side of the center portion, wherein the first wing out is hingedly coupled to one side of the center portion, and the second wing out is hingedly coupled to the other side of the center portion.

A size of an accommodation space between the center portion, the first wing out, and the second wing out may vary by rotation of the first wing out and the second wing out.

The air cell includes a center air cell disposed in the center portion, a first side air cell disposed in the first wing out, and a second side air cell disposed in the second wing out.

A vehicle seat includes the above-described headrest.

A vehicle includes the above-described headrest.

According to an aspect of the present disclosure, a seat for a vehicle includes a seating portion; a backrest portion disposed on one side of the seating portion; and a headrest disposed above the backrest portion, where the headrest includes a body portion disposed above the backrest portion; a support portion operably connected to (e.g., disposed in front of) the body portion; and an air cell disposed on the support portion, where a volume of the air cell expands toward a front of the headrest, and the support portion is configured to be slidably movable along the body portion.

The headrest includes a driving unit coupled to the body portion and slidably moving the support portion with respect to the body portion.

The seat includes a stay connecting the headrest and the backrest portion.

A flow pipe supplying air to the air cell is disposed inside the stay.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
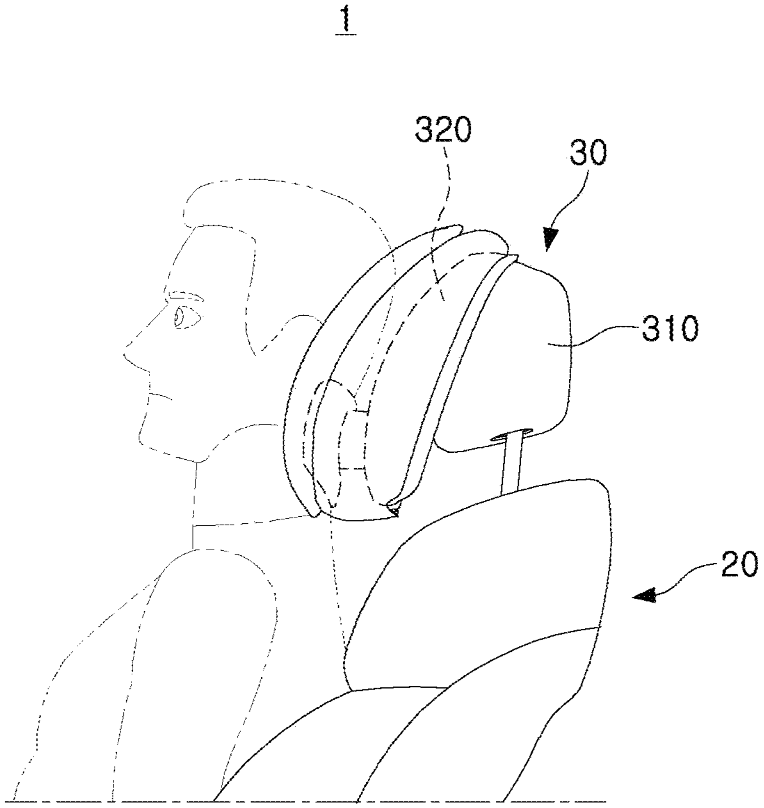
FIGS. 1 and 2 are diagrams illustrating the disposition of a headrest according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present disclosure will be described in detail with reference to the accompanying drawings. In adding reference numerals to elements of each of the drawings, although the same elements are illustrated in other drawings, like reference numerals may refer to like elements. Since the present disclosure can make various changes and have various embodiments, specific embodiments are illustrated in the drawings and described in detail. However, this is not intended to limit the present disclosure to specific embodiments, and should be understood to include all modifications, equivalents, and substitutes included in the spirit and scope of the present disclosure.

Terms such as "first," "second," and the like, may be used to describe various components, but the components should not be limited by the terms. These terms are only used for the purpose of distinguishing one component from another component. For example, a first element may be termed a second element, and similarly, a second element may be termed a first element, without departing from the scope of the present disclosure.

Unless defined otherwise, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art, and unless explicitly defined in this application, they should not be interpreted in an ideal or excessively formal meaning.

In the present specification, a vehicle refers to various vehicles moving objects to be transported such as people, animals, or goods from a starting point to a destination. The vehicle is not limited to a vehicle running on roads or tracks. In addition, the vehicle not only includes a vehicle using fossil fuels such as gasoline and gasoline, but also includes a vehicle using secondary batteries using electricity stored in batteries, or the like and a vehicle using future fuels such as hydrogen.

In the description below, terms in relation to a direction in the description below such as "front", "rear", "lateral", "front", "back", "up and down", "above", "upper", "upper portion", "below", "lower", "lower portion, "left and right", and the like are defined based on a vehicle or a vehicle body. In addition, terms such as "first," "second," and the like, may be used to describe various components, but the components should not be limited by the terms. These terms are only used for the purpose of distinguishing one component from another component.

Hereinafter, preferred embodiments of the present disclosure will be described in more detail with reference to the attached drawings.

Figure 2:
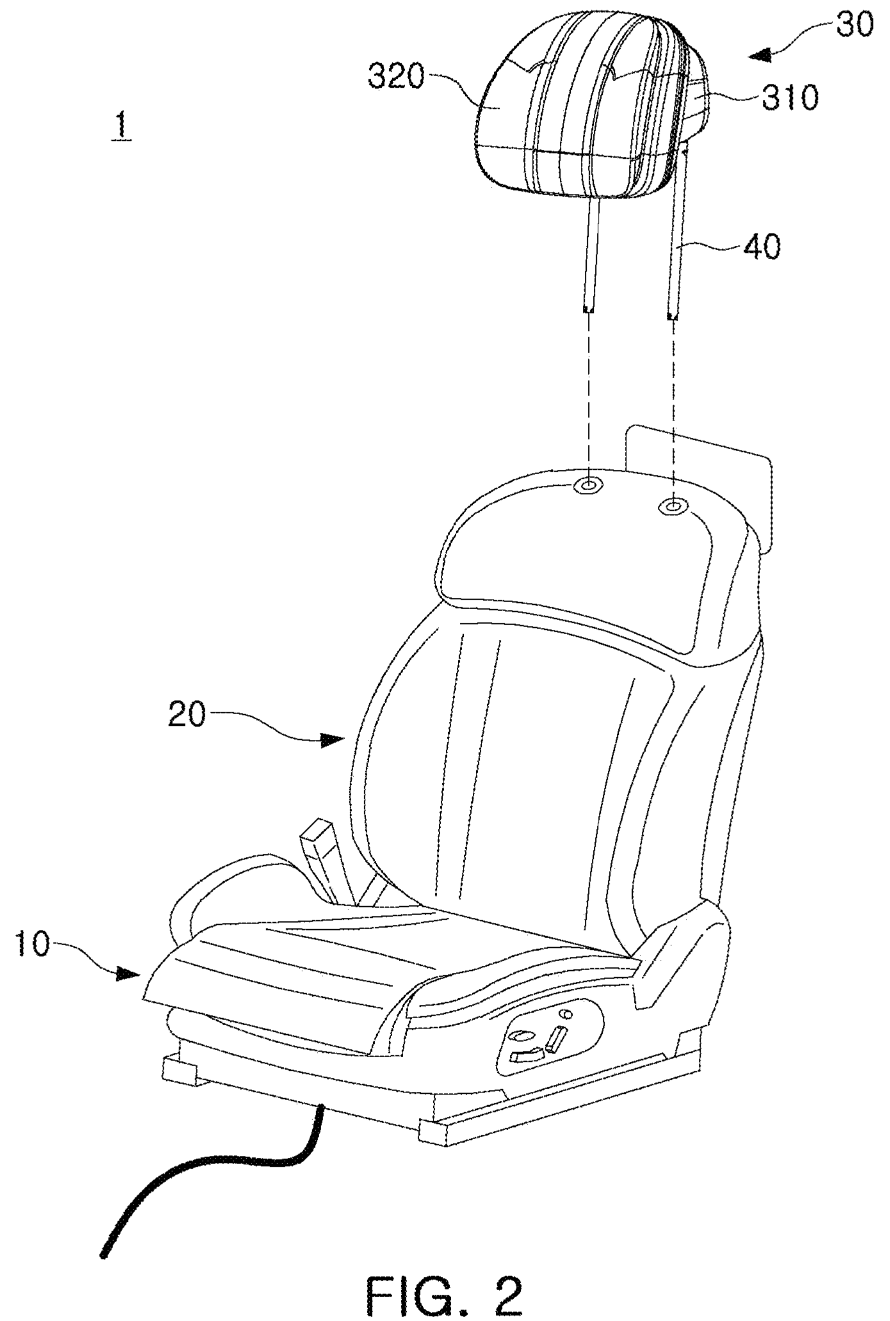

FIGS. 1 and 2 are diagrams for illustrating the disposition of a headrest according to an embodiment of the present disclosure. Referring to FIGS. 1 and 2, structures of a headrest and a seat according to an embodiment of the present disclosure is described.

The seat 1 includes a seating portion 10, a backrest portion 20, and a headrest 30. The seating portion 10 is disposed relatively lower than the backrest portion 20, and is a means on which the occupants sit. The backrest portion 20 may be disposed at the rear of the seating portion 10. In addition, the headrest 30 may be disposed above the backrest portion 20.

The seating portion 10 supports occupant's buttocks, the backrest portion 20 supports occupant's back, and the headrest 30 supports occupant's head.

To protect occupant's cervical spine in situations such as an accident or sudden braking of the vehicle, the most protruding portion of the headrest 30 may be disposed to contact the rearmost protruding portion of the occupant's head. In this case, a position of the headrest 30 may be referred to as a safe position. However, since physical conditions such as occupant's height or sitting height vary depending on the occupant, the position of the headrest 30 may need to be appropriately adjusted according to the physical conditions of the occupant. To dispose the headrest 30 in the safe position, a stay 40 may be used.

The stay 40 is a means of connecting the backrest portion and the headrest 30. The headrest 30 may be coupled to the stay 40, and a portion of the stay 40 may protrude externally of the headrest 30. The portion of the stay 40 protruding externally of the headrest 30 may be inserted into the backrest portion 20, and the position of the headrest 30 may be adjusted by adjusting a depth into which the stay 40 is inserted.

Referring to FIG. 1, it can be seen that the most protruding position of the headrest 30 is disposed lower than the rearmost protruding portion of the occupant's head. The position of the headrest 30 according to FIG. 1 is a position, suitable for the headrest 30 according to an embodiment of the present disclosure to perform a massage function. In this case, the position of the headrest 30 may be referred to as a resting position. The resting position may refer to a position in which the headrest 30 is lowered relatively as compared to the case in which the headrest 30 is in the safe position.

That is, a portion disposed below the headrest 30 may be disposed in front of the headrest 30 to overlap a portion of the occupant's neck. Accordingly, a portion of the headrest 30, protruding most forward the headrest 30 may be disposed lower than the portion of the occupant's head, protruding most rearward the headrest 30. Through this dispositional structure of the headrest 30, a portion of the headrest 30 may form a structure surrounding a portion of the occupant's neck.

Figure 3:
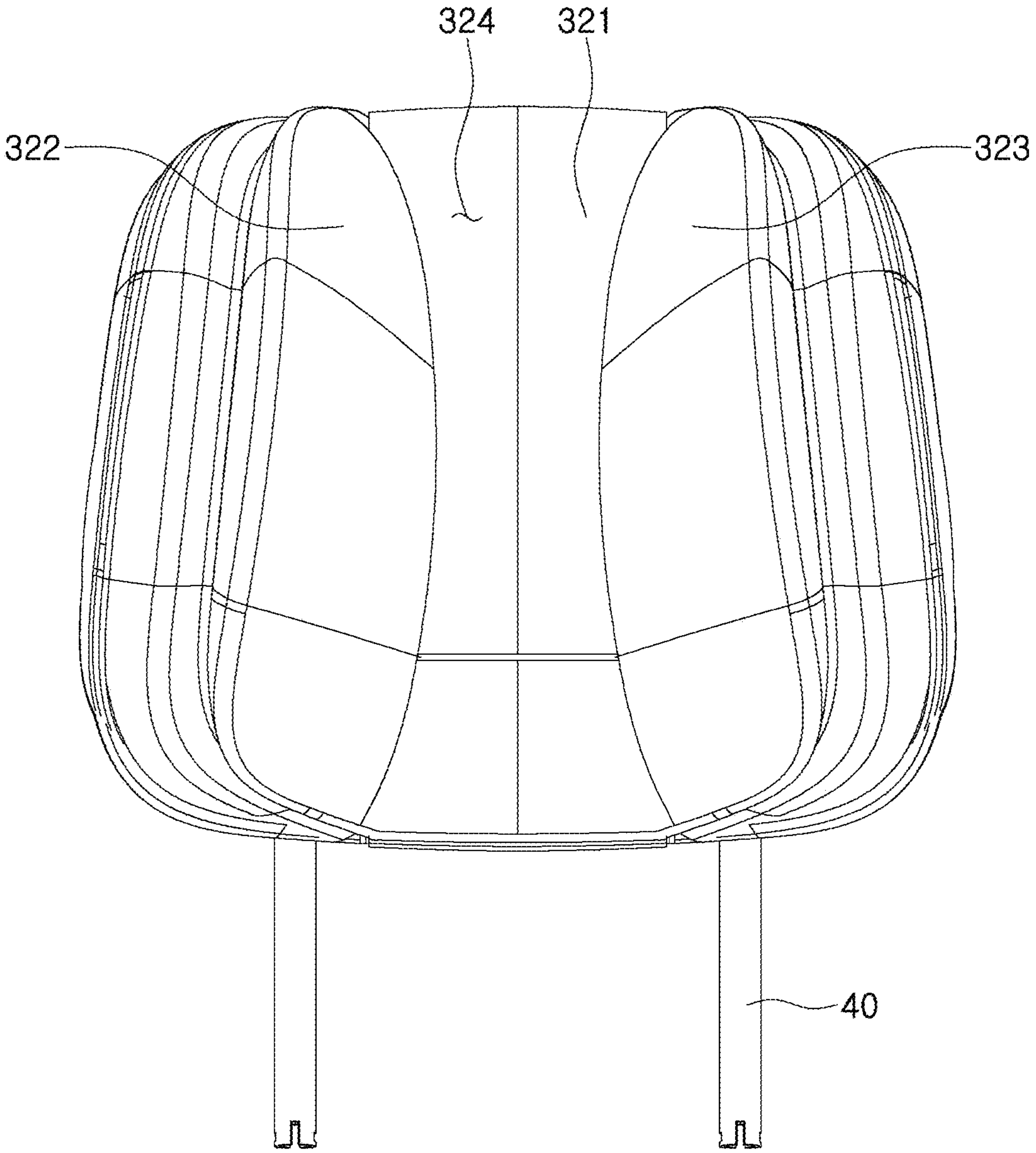
FIG. 3 is a front view of a headrest according to an embodiment of the present disclosure.

FIG. 3 is a front view of a headrest according to an embodiment of the present disclosure. The headrest 30 may include a center portion 321, a first wing out 322, and a second wing out 323. A portion of a stay 40 may be protrude below the headrest 30.

The headrest 30 may have a frame structure including a mechanical device disposed therein, and an outside of the headrest 30 may be covered with an outer shell formed of a material having elasticity or elasticity. As an example, the outer shell of the headrest 30 may be covered with fabric or leather. In addition, the outer shell may cover all or part of the headrest 30.

Based on FIG. 3, the center portion 321 may refer to a region located relatively in a center of the headrest 30. A wing out may be disposed on one side and the other side of the center portion 321. The wing out may include a first wing out 322 disposed on one side of the center portion 321 and a second wing out 323 disposed on the other side of the center portion 321.

The wing out may have a shape similar to wings. In other words, the wing out can move similarly to wings.

One side of the first wing out 322 may be hingedly coupled to one side of the center portion 321. The first wing out 322 may rotate within a predetermined range around the portion thereof coupled to one side of the center portion 321 as an axis.

One side of the second wing out 323 may be hingedly coupled to the other side of the center portion 321. The second wing out may rotate within a predetermined range around the portion thereof coupled to one side of the center portion as an axis.

A portion of the occupant's head may be disposed in the accommodation space 324 formed between the center portion 321, the first wing out 322, and the second wing out 323. The first wing out 322 and the second wing out 323 may rotate within a predetermined range while coupled to the center portion 321, and accordingly, an average separation distance between the first wing out 322 and the second wing out 323 may become closer or farther away. That is, a size of the accommodation space 324 formed between the center portion 321, the first wing out 322, and the second wing out 323 may vary by rotation of the first wing out 322 and the second wing out 323.

When the average separation distance between the first wing out 322 and the second wing out 323 becomes closer, the first wing out 322 and the second wing out 323 may be in close contact with a portion of occipital regions and neck of the occupant.

Figure 4:
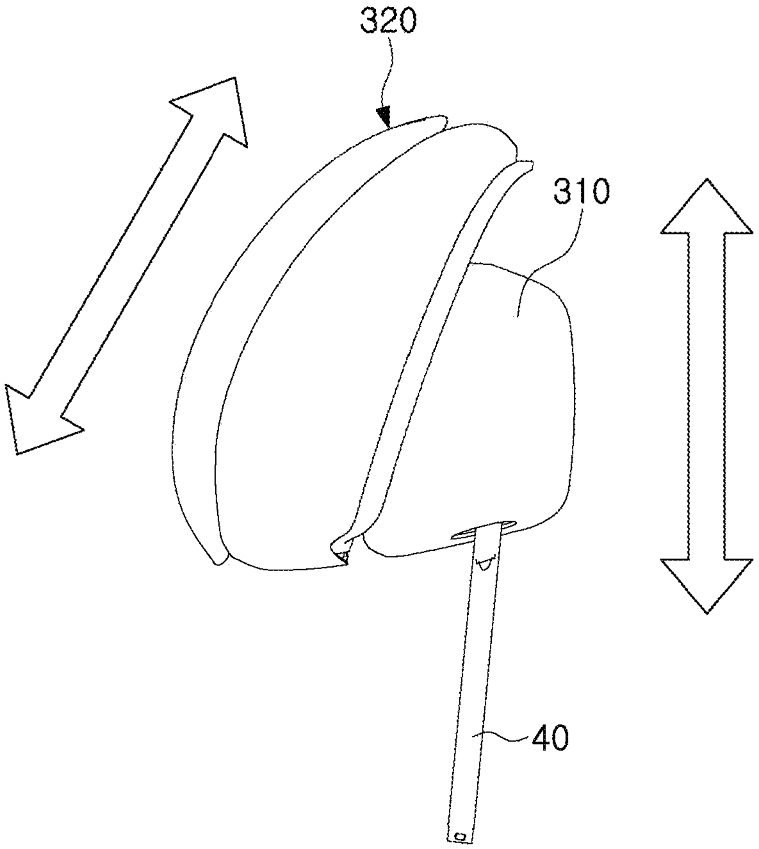
FIG. 4 is a diagram illustrating a portion of operations of a headrest according to an embodiment of the present disclosure.

FIG. 4 is a diagram for illustrating a portion of operations of a headrest according to an embodiment of the present disclosure.

The headrest 30 according to an embodiment of the present disclosure may include a body portion 310 and a support portion 320.

The body portion 310 may be disposed relatively behind the headrest 30 as compared to the support portion 320. The stay 40 described above may be coupled to the body portion 310. A portion of the stay 40 may be disposed inside the body portion 310, and the other portion of the stay 40 may protrude outwardly through a lower portion of the body portion 310. The body portion 310 may slide along the stay 40. That is, the stay 40 may guide the movement of the body portion 310. By the movement of the body portion 310, the headrest 30 can move in a vertical direction relative to the ground.

The support portion 320 may be disposed relatively in front of the headrest 30, as compared to the body portion 310. The support portion 320 may be disposed in front of the body portion 310. In addition, the support portion 320 may be coupled to the body portion 310 so as to be movable in the body portion 310. The support portion 320 may slide along the body portion 310.

The position of the headrest 30 may be appropriately adjusted by movement of the body portion 310 and movement of the support portion 320. That is, the position of the headrest 30 may be adjusted so that the massage device of the headrest 30 may appropriately press the occupant's neck through the movement of the body portion 310 and the support portion 320.

Figure 5:
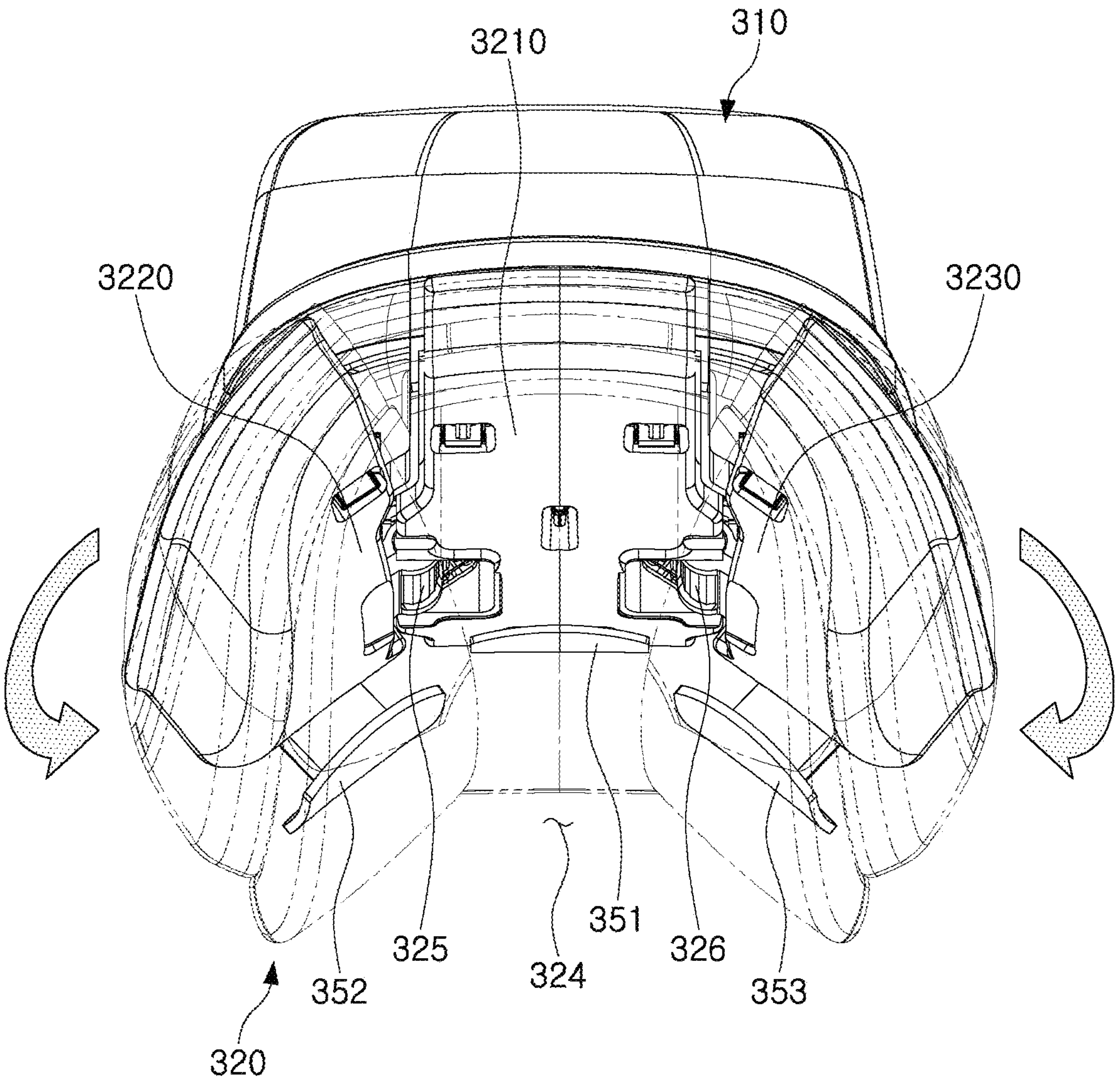
FIG. 5 is a diagram illustrating the shape of an interior of an outer shell of a headrest according to an embodiment of the present disclosure.
Figure 6:
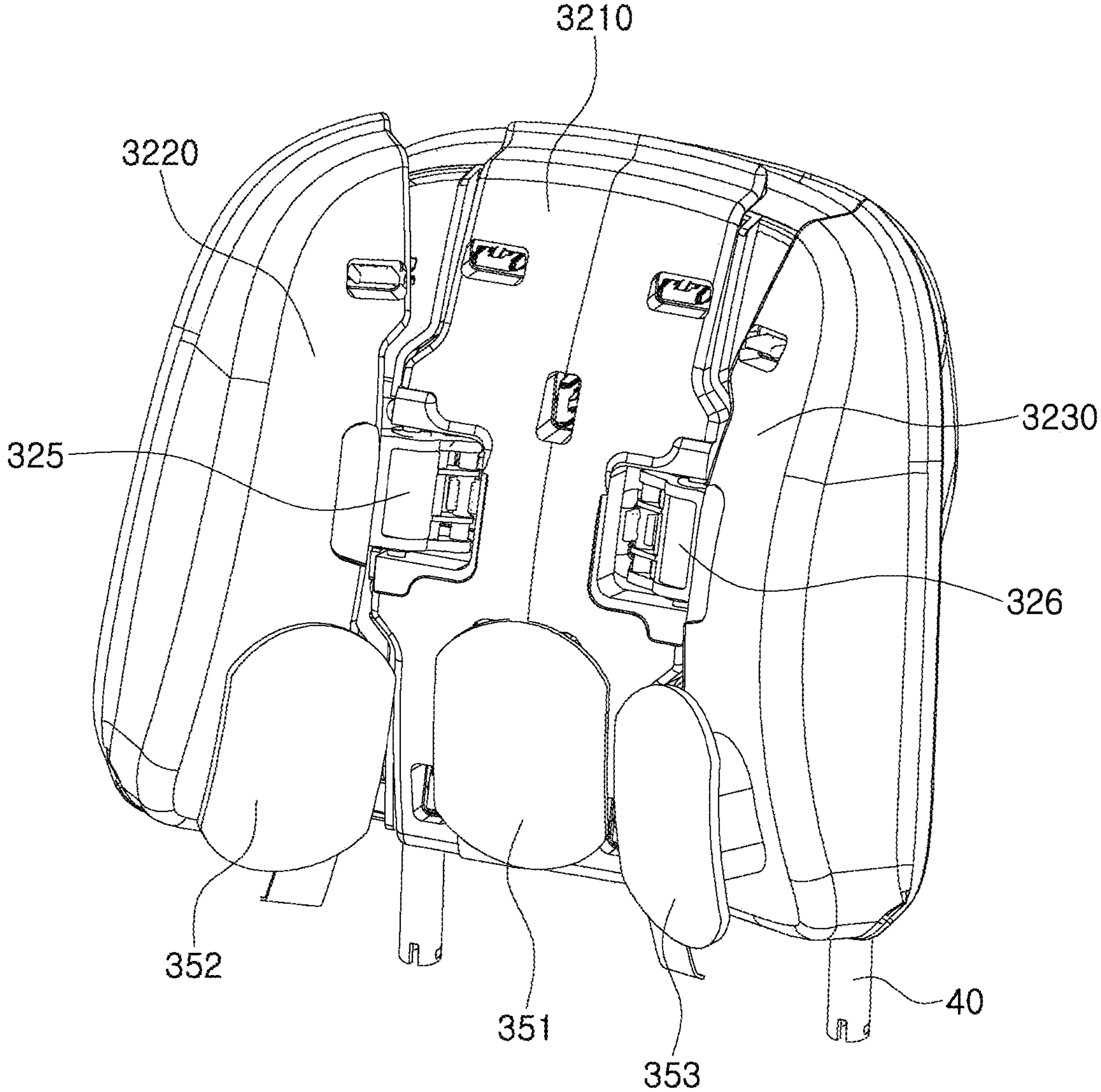
FIG. 6 is a diagram illustrating a headrest according to an embodiment of the present disclosure, excluding the outer shell thereof.
Figure 7:
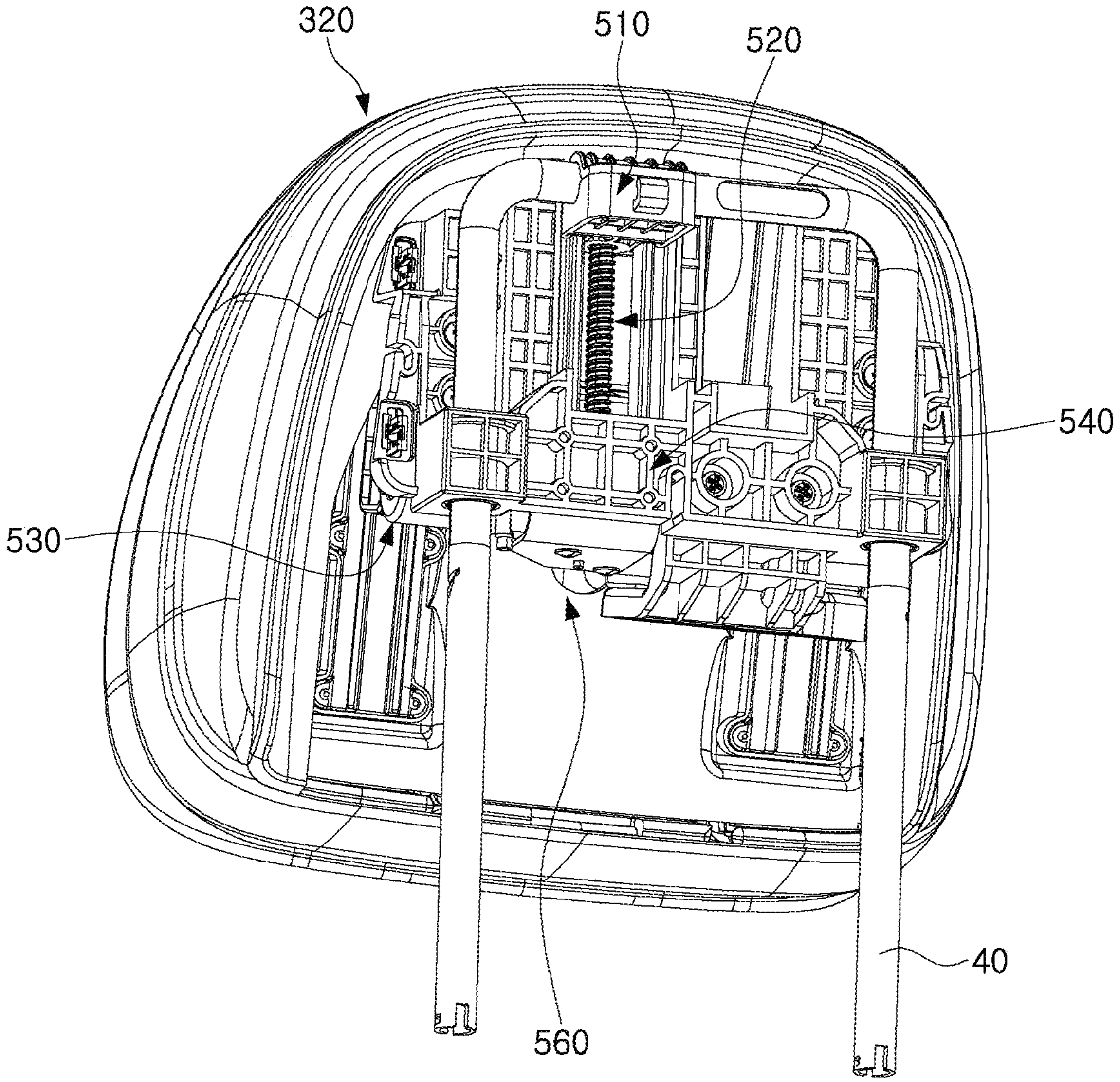
FIG. 7 is a diagram illustrating an inner rear side of the headrest according to an embodiment of the present disclosure.
Figure 8:
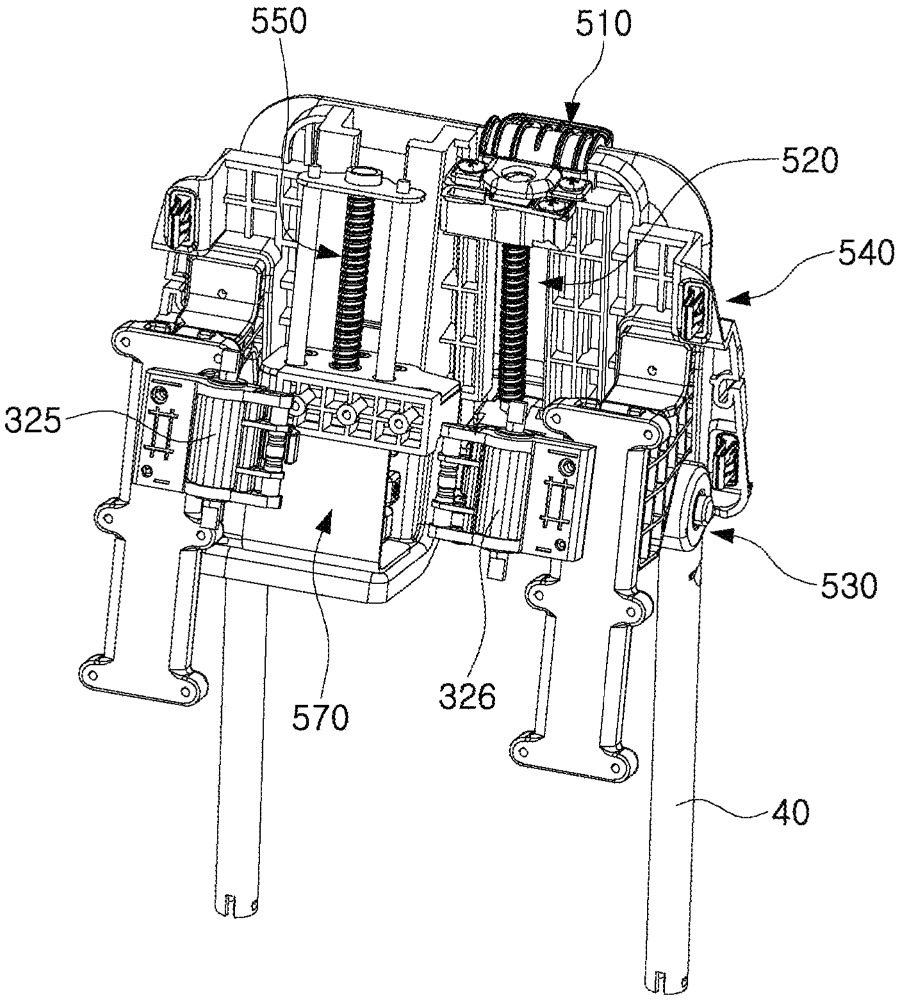
FIG. 8 is a perspective view illustrating a driving unit disposed inside the body portion of a headrest according to an embodiment of the present disclosure viewed from the front thereof.

FIG. 5 is a view illustrating the shape of an interior of an outer shell of a headrest according to an embodiment of the present disclosure, and FIG. 6 is a view illustrating a headrest according to an embodiment of the present disclosure, excluding the outer shell thereof. FIG. 7 is a view illustrating an inner rear side of a headrest according to an embodiment of the present disclosure. Specifically, FIG. 7 is a perspective view of the headrest 30 viewed from the rear of the headrest, and illustrates the rear inner side of the headrest 30 with the cover forming an exterior of the body 310 removed. FIG. 8 is a perspective view illustrating a driving unit disposed inside a body portion of a headrest viewed from the front thereof according to an embodiment of the present disclosure.

Referring to FIGS. 5 and 6, the headrest 30 may include a body portion 310 and a support portion 320. The support portion 320 may be disposed in front of the body portion 310. The support portion 320 may include a center frame 3210 and a wing out frame.

A first wing out frame 3220 and a second wing out frame 3230 may be disposed on each of one side and the other side of the center frame 3210, respectively.

The first wing out frame 3220 may be hingedly coupled to one side of the center frame 3210. A first motor 325 may be disposed between the first wing out frame 3220 and the center frame 3210. The first motor 325 may rotate the first wing out frame 3220.

The second wing out frame 3230 may be hingedly coupled to the other side of the center frame 3210. A second motor 32 may be disposed between the second wing out frame 3230 and the center frame 3210. The second motor 326 may rotate the second wing out frame 3230.

Air cells may be disposed in the support portion 320. Specifically, the plurality of air cells may be disposed, and the air cells may be disposed in the center frame 3210, the first wing out frame 3220, and the second wing out frame 3230, respectively. The air cells disposed in the center frame 3210 may be referred to as center air cells 351. The air cells disposed in the first wing out frame 3220 may be referred to as first side air cells 352. The air cells disposed in the second wing out frame 3230 may be referred to as second side air cells 353.

The air cell may be disposed relatively downwardly, based on a height direction of the support portion. That is, the air cell may be disposed in a portion of the headrest 30, and in this case, the air cell may be disposed in a position biased toward the backrest portion 20.

A volume of the air cell may vary. In other words, when air is injected into the air cell, the volume of the air cell increases, and when air is discharged from of the air cell, the volume of the air cell may decrease.

When described based on the case in which an occupant is seated on the seat 1, the volume of the air cell may be expanded toward the occupant. In other words, the volume of the air cell may be expanded toward the neck or occipital regions of the occupant. By changing the volume of the air cell, the air cell may exert pressure on portions of the occupant's body.

Referring to FIGS. 7 and 8, a driving unit 500 may be disposed on the headrest 30. That is, the driving unit 500 may be disposed inside the body portion 310 of the headrest 30.

A portion of the driving unit 500 may be coupled to the support portion 320, and the other portion of the driving unit 500 may be coupled to the stay 40. The body portion 310 may move relative to the stay 40 through the driving unit 500. In addition, the support portion 320 may move relative to the body portion 310 through the driving unit 500.

The driving unit 500 may include a first fixing unit 510. The first fixing unit 510 may be coupled to the stay 40. The first fixing unit 510 may be coupled to the stay 40 and the first lead screw 520. One end of the first lead screw 520 may be coupled to the first fixing unit 510. In addition, the first lead screw 520 may be mechanically connected to the first driving motor 530.

A first moving frame 540 may be movably coupled to the first lead screw 520. That is, the first moving frame 540 may be disposed to be movable in a longitudinal direction of the first lead screw 520 by the operation of the first driving motor 530.

The stay 40 may be disposed to penetrate a portion of the first moving frame 540. Through this structure, the first moving frame 540 may move relative to the stay 40, and the stay 40 may guide the movement of the first moving frame 540.

The driving unit 500 may include a second moving frame 570. The second moving frame 570 may be coupled to the first moving frame 540 to enable the relative movement with respect to the first moving frame 540. A center frame 3210 of the support portion 320 may be coupled to the second moving frame 570. Accordingly, the support portion 320 may slide along the body portion 310 by the movement of the second moving frame 570.

The driving unit 500 may include a second lead screw 550. One end of the second lead screw 550 may be coupled to the first moving frame 540. The second lead screw 550 may be mechanically connected to the second driving motor 560.

The second moving frame 570 may be movably coupled to the second lead screw 550. That is, the second moving frame 570 may be movably disposed in the longitudinal direction of the second lead screw 550 by the operation of the second driving motor 560.

Figure 9:
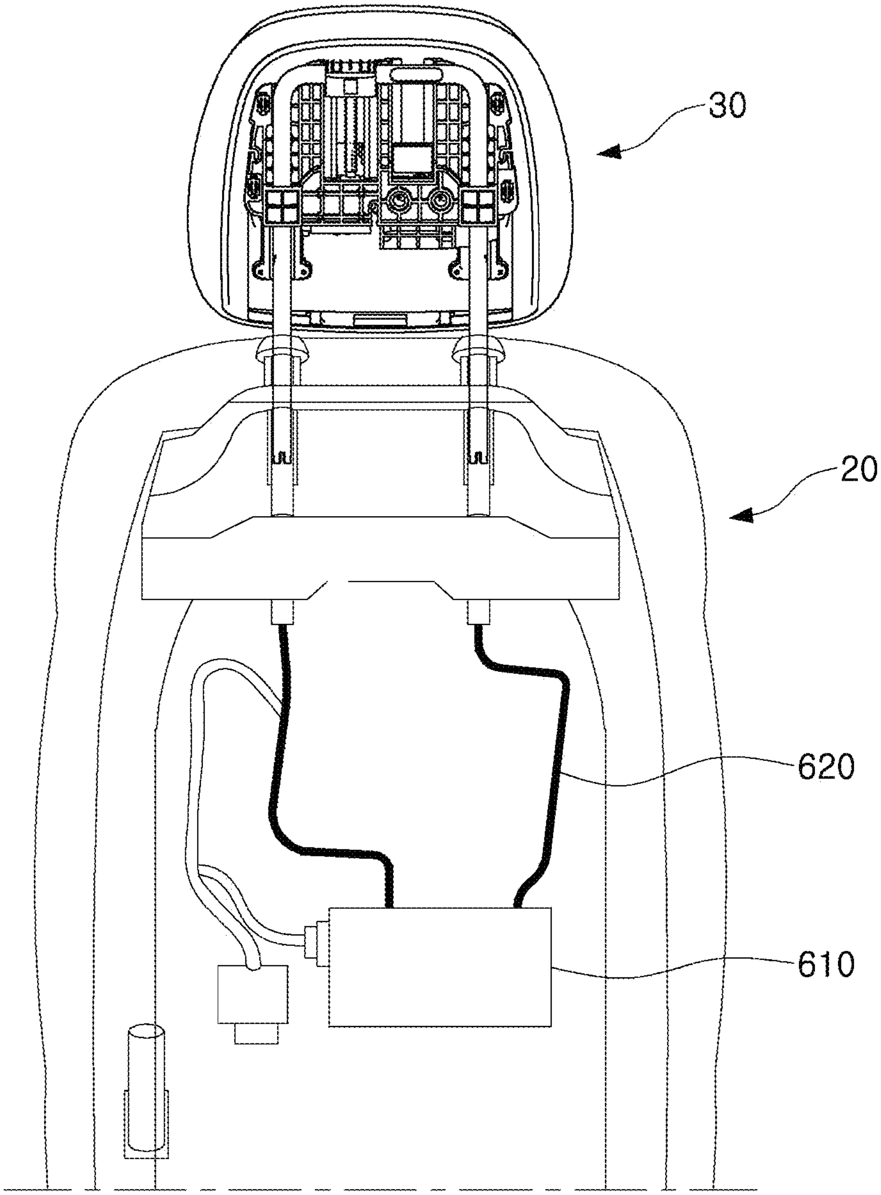
FIG. 9 is a schematic diagram illustrating a portion of an inner rear side of a seat according to an embodiment of the present disclosure.

FIG. 9 is a schematic diagram illustrating a portion of an inner rear side of a seat according to an embodiment of the present disclosure.

A stay 40 coupled to the headrest 30 is inserted into an upper portion of the backrest portion 20. An air supply device 610 and a control device may be disposed on the backrest portion 20.

A flow pipe 620 may be connected to the air supply device 610. The flow pipe 620 is connected to an air cell and may supply air to the air cell. Specifically, the stay 40 has a pipe structure with an empty interior, and the flow pipe 620 connected to the air supply device 610 may be connected to the air cell of the headrest 30 through an internal space of the stay 40.

In addition, a power supply line may be disposed in the internal space of the stay 40, and a first motor 325, a second motor 326, a first driving motor 530, and a second driving motor 560 disposed on the headrest 30 may operate through the power supply line.

The control unit may control the operations of the air supply device 610, the first motor 325, the second motor 326, the first driving motor 530, and the second driving motor 560 using electrical signals.

According to an embodiment of the present disclosure, the headrest 30 may be raised and lowered, relative to the backrest portion 20 through movement of the first moving frame 540, and the support portion 320 of the headrest 30 may be slidably moved relative to the body portion 310 of the headrest 30 through the second moving frame 570, thereby allowing the support portion 320 of the headrest 30 to be moved to an appropriate first position. In this case, the first position may refer to a position of a support portion, suitable for massaging the occupant's neck with an air cell.

When the support portion 320 of the headrest 30 is disposed in the first position, the first wing out 322 and the second wing out 323 may be rotated and disposed in a second position. The first wing out 322 and the second wing out 323 may rotate within a predetermined range while coupled to the center portion 321, and a size of an accommodation space 324 formed between the first wing out 322, the center portion 321, and the second wing out 323 may be adjusted by the rotation of the first wing out 322 and the second wing out 323. The second position may refer to positions of the first wing out 322 and the second wing out 323, suitable for massaging the occupant's neck with an air cell.

In the case of the headrest according to an embodiment of the present disclosure, the position of the support portion of the headrest can be adjusted to effectively massage the occupant's neck, thereby reducing occupant fatigue.

As set forth above, according to an embodiment of the present disclosure, a headrest may have an effect of reducing occupant fatigue by effectively massaging occupant's neck muscles.

While exemplary embodiments have been illustrated and described above, it will be apparent to those skilled in the art that modifications and variations could be made without departing from the scope of the present invention as defined by the appended claims.

What is claimed is:

1. A headrest for a seat of a vehicle, comprising:
- a body portion;
- a driving unit disposed within the body portion;
- a support portion operably connected to the body portion; and
- an air cell disposed on the support portion, wherein a volume of the air cell is configured to expand toward a front of the headrest,
- wherein the support portion is configured to be slidably movable along the body portion, and
- wherein the support portion is configured to slide in a diagonal direction downward and forward simultaneously to be positioned at a neck of an occupant.

2. The headrest of claim 1, wherein the support portion is disposed in front of the body portion.

3. The headrest of claim 1, wherein the headrest further comprises a driving unit coupled to the body portion.

4. The headrest of claim 3, wherein the driving unit is configured to slidably move the support portion with respect to the body portion.

5. The headrest of claim 1, wherein the body portion is disposed above a backrest portion of the seat and is configured to be raised and lowered relative to the backrest portion.

6. The headrest of claim 1, wherein the driving unit is configured to raise and lower the body portion relative to the backrest portion.

7. The headrest of claim 1, wherein the seat comprises a stay disposed above the backrest portion for raising and lowering the driving unit.

8. The headrest of claim 1, wherein the support portion comprises a center portion, and a first wing out and a second wing out respectively disposed on opposite sides of the center portion.

9. The headrest of claim 8, wherein:

the first wing out is hingedly coupled to one side of the center portion, and the second wing out is hingedly coupled to another side of the center portion.

10. The headrest of claim 8, further comprising an accommodation space between the center portion, the first wing out, and the second wing out.

11. The headrest of claim 10, wherein a size of the accommodation space varies by rotation of the first wing out and the second wing out.

12. The headrest of claim 8, wherein the air cell comprises a center air cell disposed in the center portion, a first side air cell disposed in the first wing out, and a second side air cell disposed in the second wing out.

13. A vehicle seat comprising the headrest of claim 1.

14. A vehicle comprising the headrest of claim 1.

15. A seat for a vehicle, the seat comprising:

a seating portion;

a backrest portion disposed on one side of the seating portion;

a headrest disposed above the backrest portion; and a stay connecting the headrest and the backrest portion, wherein the headrest includes:

a body portion disposed above the backrest portion;

a support portion operably connected to the body portion; and an air cell disposed on the support portion, wherein a volume of the air cell is configured to expand toward a front of the headrest, wherein the support portion is configured to be slidably movable along the body portion, and wherein a flow pipe supplying air to the air cell is disposed inside the stay.

16. The seat of claim 15, wherein the support portion is disposed in front of the body portion.

17. The seat of claim 15, wherein the headrest further comprises a driving unit coupled to the body portion for slidably moving the support portion with respect to the body portion.

* * * * *